United States Patent
Morgan et al.

(10) Patent No.: US 8,275,617 B1
(45) Date of Patent: *Sep. 25, 2012

(54) SPEECH COMMAND INPUT RECOGNITION SYSTEM FOR INTERACTIVE COMPUTER DISPLAY WITH INTERPRETATION OF ANCILLARY RELEVANT SPEECH QUERY TERMS INTO COMMANDS

(75) Inventors: Scott Anthony Morgan, Austin, TX (US); David John Roberts, Stockton (GB); Craig Ardner Swearingen, Austin, TX (US); Alan Richard Tannenbaum, Austin, TX (US); Anthony Christopher Courtney Temple, Northants (GB)

(73) Assignee: Nuance Communications, Inc., Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/213,856

(22) Filed: Dec. 17, 1998

(51) Int. Cl.
 G10L 15/04 (2006.01)
 G10L 21/00 (2006.01)

(52) U.S. Cl. ........................... 704/251; 704/275

(58) Field of Classification Search .................. 704/235, 704/251, 270, 275, 231
See application file for complete search history.

(56) References Cited

U.S. PATENT DOCUMENTS

| | | | |
|---|---|---|---|
| 4,451,895 A | 5/1984 | Sliwkowski | |
| 4,506,142 A | 3/1985 | Takano et al. | |
| 4,726,065 A | 2/1988 | Froessl | 381/41 |
| 4,766,529 A | 8/1988 | Nakano et al. | 364/513.5 |
| 4,783,759 A | 11/1988 | Borgendale et al. | |
| 4,866,778 A * | 9/1989 | Baker | 704/254 |
| 5,027,406 A | 6/1991 | Roberts et al. | 381/43 |
| 5,068,900 A | 11/1991 | Searcy et al. | 381/43 |
| 5,133,011 A | 7/1992 | McKiel, Jr. | 381/43 |
| 5,157,384 A | 10/1992 | Greanias et al. | 340/706 |
| 5,222,146 A | 6/1993 | Bahl et al. | 381/41 |
| 5,231,670 A * | 7/1993 | Goldhor et al. | 704/275 |
| 5,251,130 A | 10/1993 | Andrews et al. | |
| 5,305,244 A | 4/1994 | Newman et al. | 364/708.1 |
| 5,386,494 A * | 1/1995 | White | 704/275 |
| 5,408,582 A | 4/1995 | Colier | 395/2.52 |
| 5,428,707 A | 6/1995 | Gould et al. | 395/2.4 |
| 5,452,397 A | 9/1995 | Ittycheriah et al. | |
| 5,465,317 A | 11/1995 | Epstein | 395/2.45 |
| 5,500,920 A | 3/1996 | Kupiec | 395/2.79 |

(Continued)

OTHER PUBLICATIONS

Creative Labs, Inc. ("VoiceAssist™ Development Documentation Book", Jul. 1993), 24 pages.

(Continued)

*Primary Examiner* — Angela A Armstrong
(74) *Attorney, Agent, or Firm* — Wolf, Greenfield & Sacks, P.C.

(57) ABSTRACT

In an interactive computer controlled display system with speech command input recognition and visual feedback, implementations are provided for predetermining a plurality of speech commands for respectively initiating each of a corresponding plurality of system actions in combination with implementations for providing for each of said plurality of commands, an associated set of speech terms, each term having relevance to its associated command. Also included are implementations for detecting speech command and speech terms. The system provides an implementation responsive to a detected speech command for displaying said command, and an implementation responsive to a detected speech term having relevance to one of said commands for displaying the relevant command. The system further comprehends an interactive implementation for selecting a displayed command to thereby initiate a system action; this selecting implementation is preferably through a speech command input. The system preferably displays the basic speech commands simultaneously along with the relevant commands.

12 Claims, 7 Drawing Sheets

U.S. PATENT DOCUMENTS

| | | | |
|---|---|---|---|
| 5,526,407 A | 6/1996 | Russell et al. | 379/89 |
| 5,553,121 A | 9/1996 | Martin et al. | 379/88 |
| 5,602,963 A | 2/1997 | Bissonnette et al. | 395/2.84 |
| 5,604,840 A | 2/1997 | Asai et al. | 395/11 |
| 5,632,002 A | 5/1997 | Hashimoto et al. | 395/2.4 |
| 5,638,486 A | 6/1997 | Wang et al. | 395/2.45 |
| 5,664,061 A | 9/1997 | Andreshak et al. | 704/275 |
| 5,671,328 A | 9/1997 | Fitzpatrick et al. | 395/2.55 |
| 5,698,834 A | 12/1997 | Worthington et al. | 235/472 |
| 5,706,399 A | 1/1998 | Bareis | 395/2.83 |
| 5,729,659 A | 3/1998 | Potter | 395/2.79 |
| 5,748,841 A * | 5/1998 | Morin et al. | 704/257 |
| 5,774,859 A | 6/1998 | Houser et al. | |
| 5,864,815 A | 1/1999 | Rozak et al. | |
| 5,890,122 A * | 3/1999 | Van Kleeck et al. | 704/275 |
| 5,960,394 A | 9/1999 | Gould et al. | |
| 5,970,457 A * | 10/1999 | Brant et al. | 704/231 |
| 6,018,711 A | 1/2000 | French-St. George et al. | |
| 6,073,097 A | 6/2000 | Gould et al. | |
| 6,088,671 A * | 7/2000 | Gould et al. | 704/235 |
| 6,192,343 B1 | 2/2001 | Morgan et al. | |
| 6,233,560 B1 | 5/2001 | Tannenbaum | |
| 6,937,984 B1 | 8/2005 | Morgan et al. | |
| 7,206,747 B1 * | 4/2007 | Morgan et al. | 704/275 |

OTHER PUBLICATIONS

Dragon Systems, Inc. ("DragonDictate™ User's Guide", Jul. 1996), 13 pages.

* cited by examiner

SPEECH COMMAND INPUT RECOGNITION SYSTEM FOR INTERACTIVE COMPUTER DISPLAY WITH INTERPRETATION OF ANCILLARY RELEVANT SPEECH QUERY TERMS INTO COMMANDS

CROSS-REFERENCE TO RELATED COPENDING PATENT APPLICATIONS

The following patent applications, which are assigned to the assignee of the present invention and filed concurrently herewith, cover subject matter related to the subject matter of the present invention: "SPEECH COMMAND INPUT RECOGNITION SYSTEM FOR INTERACTIVE COMPUTER DISPLAY WITH MEANS FOR CONCURRENT AND MODELESS DISTINGUISHING BETWEEN SPEECH COMMANDS AND SPEECH QUERIES FOR LOCATING COMMANDS", Scott A. Morgan et al. (U.S. application Ser. No. 09/213,858 filed Dec. 16, 1998, issued as U.S. Pat. No. 7,206,747); "SPEECH COMMAND INPUT RECOGNITION SYSTEM FOR INTERACTIVE COMPUTER DISPLAY WITH TERM WEIGHTING MEANS USED IN INTERPRETING POTENTIAL COMMANDS FROM RELEVANT SPEECH TERMS," Scott A. Morgan et al. (U.S. application Ser. No. 09/213,845 filed Dec. 17, 1998, issued as U.S. Pat. No. 6,192,343); "SPEECH COMMAND INPUT RECOGNITION SYSTEM FOR INTERACTIVE COMPUTER DISPLAY WITH SPEECH CONTROLLED DISPLAY OF RECOGNIZED COMMANDS", Scott A. Morgan (U.S. application Ser. No. 09/213,846 filed Dec. 17, 1998, issued as U.S. Pat. No. 6,937,984) and "METHOD AND APPARATUS FOR PRESENTING PROXIMAL FEEDBACK IN VOICE COMMAND SYSTEMS", Alan R. Tannenbaum (U.S. application Ser. No. 09/213,857 filed Dec. 16, 1998, issued as U.S. Pat. No. 6,233,560).

TECHNICAL FIELD

The present invention relates to interactive computer controlled display systems with speech command input and more particularly to such systems which present display feedback to the interactive users.

BACKGROUND OF RELATED ART

The 1990's decade has been marked by a technological revolution driven by the convergence of the data processing industry with the consumer electronics industry. This advance has been even further accelerated by the extensive consumer and business involvement in the Internet over the past few years. As a result of these changes it seems as if virtually all aspects of human endeavor in the industrialized world require human/computer interfaces. There is a need to make computer directed activities accessible to people who up to a few years ago were computer illiterate or, at best, computer indifferent.

Thus, there is continuing demand for interfaces to computers and networks which improve the ease of use for the interactive user to access functions and data from the computer. With desktop-like interfaces including windows and icons, as well as three-dimensional virtual reality simulating interfaces, the computer industry has been working hard to fulfill such user interaction by making interfaces more user friendly by making the human/computer interfaces closer and closer to real world interfaces, e.g. human/human interfaces. In such an environment, it would be expected that speaking to the computer in natural language would be a very natural way of interfacing with the computer for even novice users. Despite these potential advantages of speech recognition computer interfaces, this technology has been relatively slow in gaining extensive user acceptance.

Speech recognition technology has been available for over twenty years, but it has only recently begun to find commercial acceptance, particularly with speech dictation or "speech to text" systems, such as those marketed by International Business Machines Corporation (IBM) and Dragon Systems. That aspect of the technology is now expected to have accelerated development until it will have a substantial niche in the word processing market. On the other hand, a more universal application of speech recognition input to computers, which is still behind expectations in user acceptance, is in command and control technology, wherein, for example, a user may navigate through a computer system's graphical user interface (GUI) by the user speaking the commands which are customarily found in the systems' menu text, icons, labels, buttons, etc.

Many of the deficiencies in speech recognition both in word processing and in command technologies are due to inherent voice recognition errors due in part to the status of the technology and in part to the variability of user speech patterns and the user's ability to remember the specific commands necessary to initiate actions. As a result, most current voice recognition systems provide some form of visual feedback which permits the user to confirm that the computer understands his speech utterances. In word processing, such visual feedback is inherent in this process, since the purpose of the process is to translate from the spoken to the visual. That may be one of the reasons that the word processing applications of speech recognition has progressed at a faster pace.

However, in speech recognition driven command and control systems, the constant need for switching back and forth from a natural speech input mode of operation, when the user is requesting help or making other queries, to the command mode of operation, when the user is issuing actual commands, tends to be very tiresome and impacts user productivity, particularly when there is an intermediate display feedback.

SUMMARY OF THE PRESENT INVENTION

The present invention and the cross-referenced copending applications are directed to provide solutions to the above-listed needs of speech recognition systems in providing command and control systems which are heuristic both on the part of the computer in that it learns and narrows from the natural speech to command user feedback cycles and on the part of the user, in that he tends to learn and narrow down to the computer system specific commands as a result of the feedback cycles. The present invention is directed to an interactive computer controlled display system with speech command input recognition which includes means for predetermining a plurality of speech commands for respectively initiating each of a corresponding plurality of system actions in combination with means for providing for each of said plurality of commands, an associated set of speech terms, each term having relevance to its associated command. Also included are means for detecting speech command and speech terms. Responsive to such detecting means, the system provides means responsive to a detected speech command for displaying said command, and means responsive to a detected speech term having relevance to one of said commands for displaying the relevant command.

The system further comprises interactive means for selecting a displayed command to thereby initiate a system action; these selecting means are preferably speech command input means. The system can display the actual speech commands, i.e., commands actually spoken by the user simultaneously with the relevant commands i.e., commands not actually spoken but found in response to spoken terms having relevance to the commands.

The system of the present invention is particularly effective when used in the implementation of distinguishing actual spoken commands from spoken queries for help and other purposes, as covered in the above cross-referenced copending application Ser. No. 09/213,858.

In accordance with an aspect of the invention, the means for providing said associated set of speech terms comprise a stored relevance table of universal speech input commands and universal computer operation terms conventionally associated with actions initiated by said input commands, and means for relating the particular interactive interface commands of said system with terms in said relevance table.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
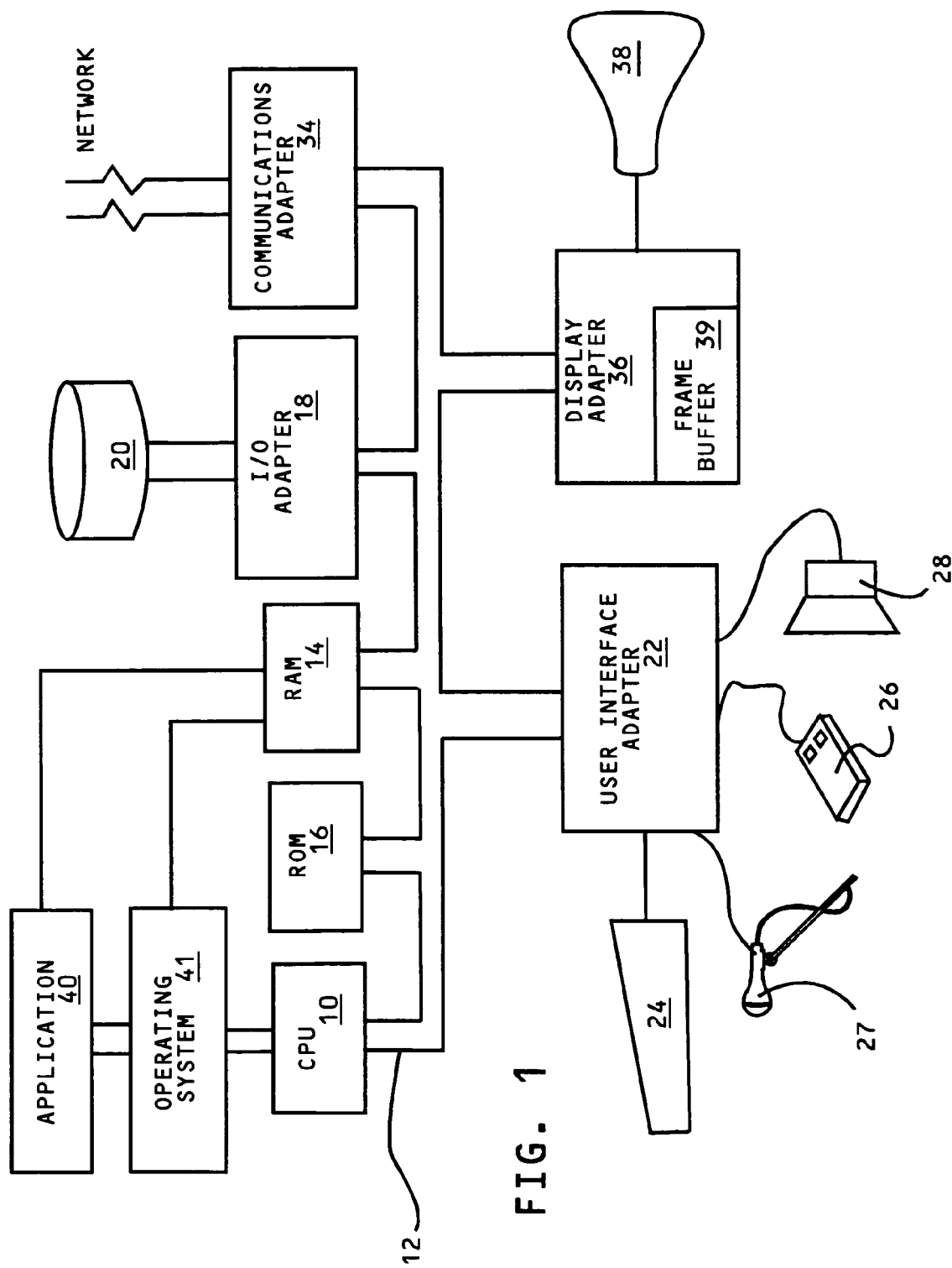
FIG. 1 is a block diagram of a generalized data processing system including a central processing unit which provides the computer controlled interactive display system with voice input used in practicing the present invention.

Referring to FIG. 1, a typical data processing system is shown which may function as the computer controlled display terminal used in implementing the system of the present invention by receiving and interpreting speech input and providing a displayed feedback, including some recognized actual commands, as well as a set of proposed relevant commands derived by comparing speech terms (other than commands) to a relevance table. A central processing unit (CPU) 10, such as any PC microprocessor in a PC available from IBM or Dell Corp. is provided and interconnected to various other components by system bus 12. An operating system 41 runs on CPU 10, provides control and is used to coordinate the function of the various components of FIG. 1. Operating system 41 may be one of the commercially available operating systems such as the OS/2™ operating system available from IBM (OS/2 is a trademark of IBM); Microsoft's Windows 95™ or Windows NT™, as well as the UNIX or AIX operating systems. A speech recognition program with visual feedback of proposed relevant commands, application 40, to be subsequently described in detail, runs in conjunction with operating system 41 and provides output calls to the operating system 41, which implements the various functions to be performed by the application 40.

A read only memory (ROM) 16 is connected to CPU 10 via bus 12 and includes the basic input/output system (BIOS) that controls the basic computer functions. Random access memory (RAM) 14, I/O adapter 18 and communications adapter 34 are also interconnected to system bus 12. It should be noted that software components, including operating system 41 and application 40, are loaded into RAM 14, which is the computer system's main memory. I/O adapter 18 may be a small computer system interface (SCSI) adapter that communicates with the disk storage device 20, i.e. a hard drive. Communications adapter 34 interconnects bus 12 with an outside network enabling the data processing system to communicate with other such systems over a local area network (LAN) or wide area network (WAN), which includes, of course, the Internet. I/O devices are also connected to system bus 12 via user interface adapter 22 and display adapter 36. Keyboard 24 and mouse 26 are all interconnected to bus 12 through user interface adapter 22. Audio output is provided by speaker 28 and the speech input which is made through input device 27, which is diagrammatically depicted as a microphone which accesses the system through an appropriate interface adapter 22. The speech input and recognition will be subsequently described in greater detail, particularly with respect to FIG. 2. Display adapter 36 includes a frame buffer 39, which is a storage device that holds a representation of each pixel on the display screen 38. Images, such as speech input commands, relevant proposed commands, as well as speech input display feedback panels, may be stored in frame buffer 39 for display on monitor 38 through various components such as a digital to analog converter (not shown) and the like. By using the aforementioned I/O devices, a user is capable of inputting visual information to the system through the keyboard 24 or mouse 26 in addition to speech input through microphone 27 and receiving output information from the system via display 38 or speaker 28.

Figure 2:
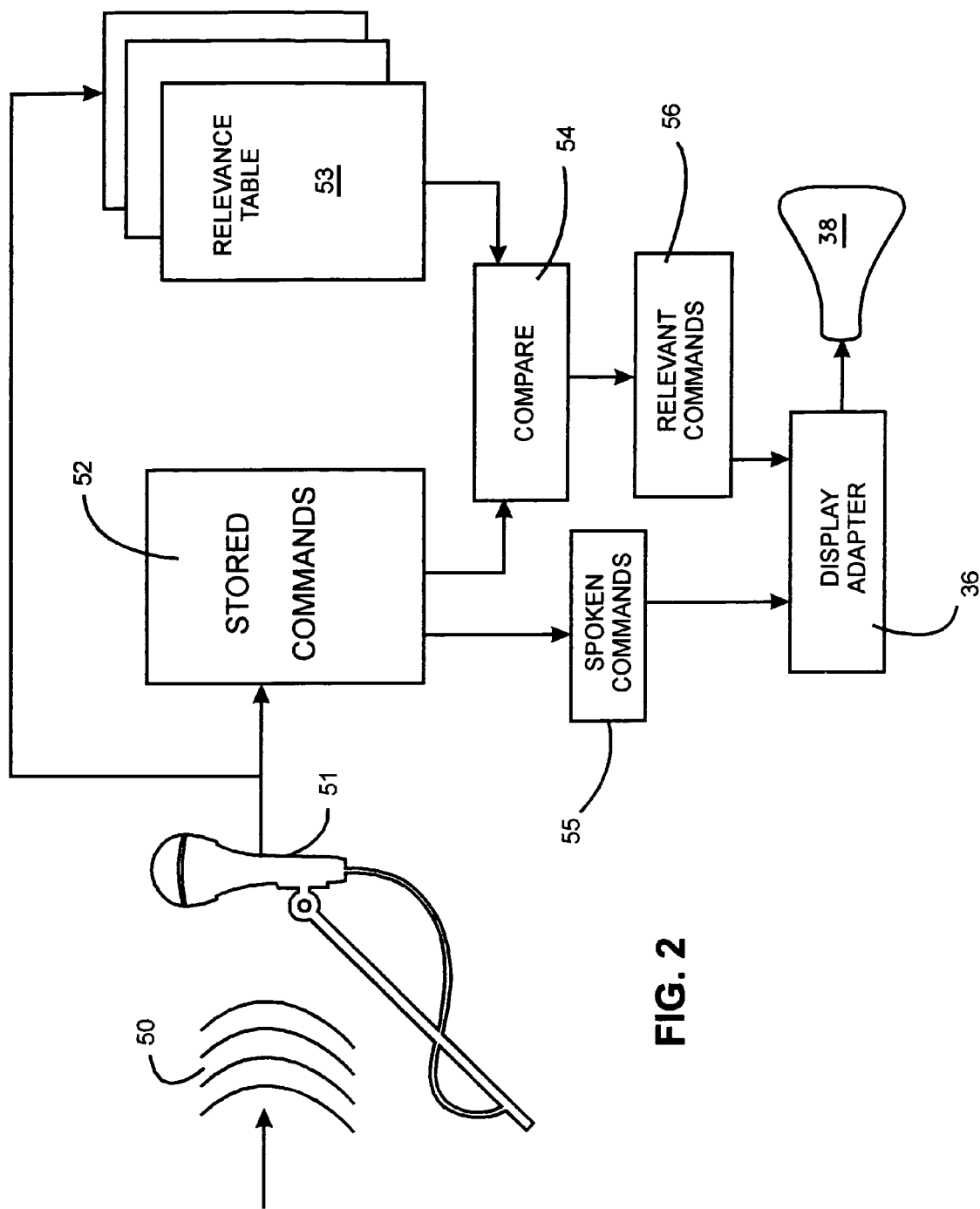
FIG. 2 is a block diagram of a portion of the system of FIG. 1 showing a generalized expanded view of the system components involved in the implementation.

Now with respect to FIG. 2, we will describe the general system components involved in implementing the invention. Voice or speech input 50 is applied through microphone 51 which represents a speech input device. Since the art of speech terminology and speech command recognition is an old and well developed one, we will not go into the hardware and system details of a typical system which may be used to implement the present invention. It should be clear to those skilled in the art that the systems and hardware in any of the following patents may be used: U.S. Pat. No. 5,671,328; U.S. Pat. No. 5,133,111; U.S. Pat. No. 5,222,146; U.S. Pat. No. 5,664,061; U.S. Pat. No. 5,553,121; and U.S. Pat. No. 5,157,384. The speech input to the system could be actual spoken commands, which the system will recognize, and/or speech terminology, which the user addresses to the computer so that the computer may propose appropriate relevant commands through feedback. The input speech goes through a recognition process which seeks a comparison to a stored set of commands 52. If an actual spoken command is clearly identified, spoken command 55, that command may be carried out and then displayed via display adapter 36 to display 38, or the spoken command may be displayed first and subsequently carried out. In this regard, the system is capable of several options, as will be subsequently described in greater detail.

Suffice it to state that the present invention provides the capability of thus displaying actual commands.

Where the speech input contains terminology other than actual commands, the system provides for a relevance table 53, which is usually a comprehensive set of terms which may be used in any connection to each of the actual stored commands 52. If any of the input speech terms compare 54 with one of the actual commands, that actual command is characterized as a relevant command 56 which is then also presented to the user on display 38 via display adapter 36. Although the relevance will be subsequently described in detail, it would be appropriate to indicate here how such a table is created. Initially, an active vocabulary is determined. This includes collecting from a computer operation, including the operating system and all significant application programs, all words and terms from menus, buttons and other user interface controls including the invisible but active words from currently active application windows, all names of macros supplied by the speech system, the application and the user, names of other applications that the user may switch to, generic commands that are generic to any application and any other words and terms which may be currently active. This basic active vocabulary is constructed into a relevance table wherein each word or term will be related to one or more of the actual commands and conversely, each of the actual commands will have associated with it a set of words and terms which are relevant to the command. It should be noted that this relevance table is dynamic in that it may be added to as appropriate to each particular computer operation. Let us assume that for a particular computer system there is a basic or generic relevance table of generic terminology, the active vocabulary for the particular system set is added to the basic relevance table and an expanded relevant vocabulary is dynamically created using at least some of the following expedients:

- each word or phrase in the active vocabulary is added to the expanded vocabulary with an indication that it is an original active vocabulary word or phrase;
- each word or phrase in the active vocabulary is looked up as an index into the relevance table. If found, the corresponding contents of the cell in the table are used to further expand the vocabulary with any additional words or phrases that the cell may contain. These additional terms would have an associated reference to the active entry which caused its inclusion;
- each phrase is then broken into its constituent words, word pairs and n-word subphrases where applicable and the above process repeated;
- users may be encouraged to come up with there own lists of words and phrases which may be indexed with respect to the relevance table; and
- a synonym dictionary may be an additional source for words and phrases.

Figure 3:
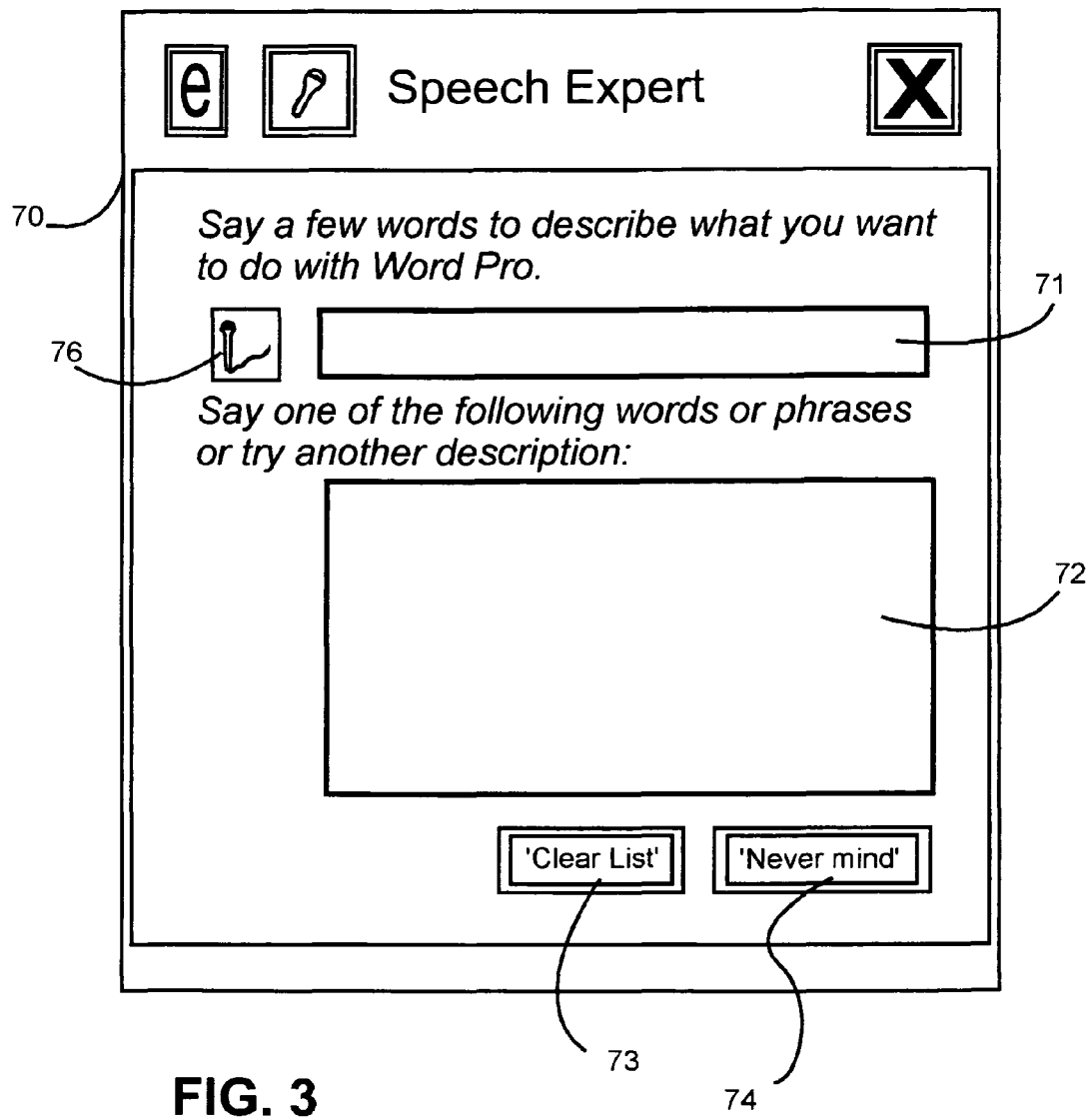
FIG. 3 is a diagrammatic view of a display screen on which an interactive dialog panel interface used for visual feedback when a speech command and/or speech term input has been made.
Figure 4:
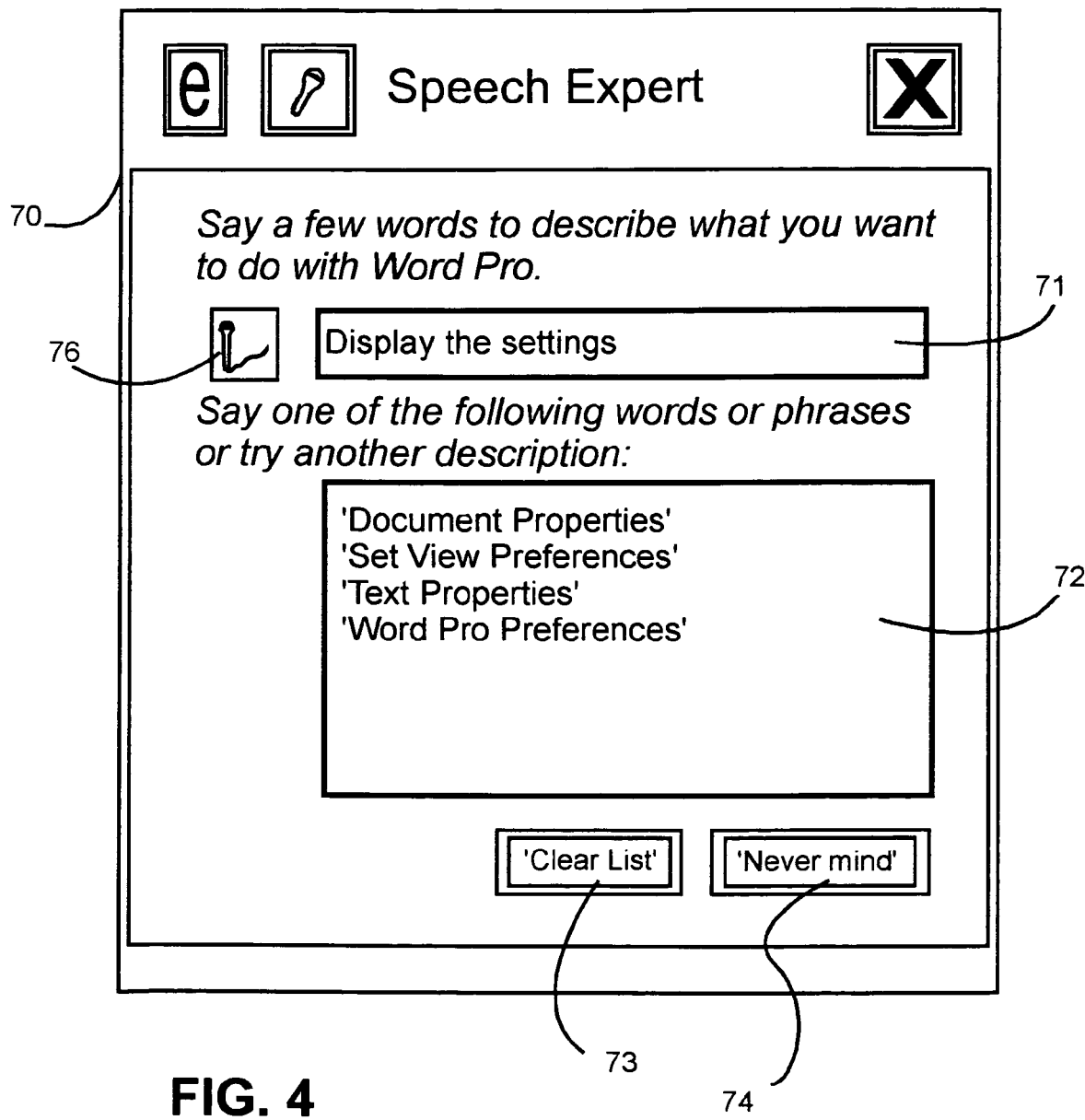
FIG. 4 is the display screen view of FIG. 3 after a speech term input has been made.
Figure 5:
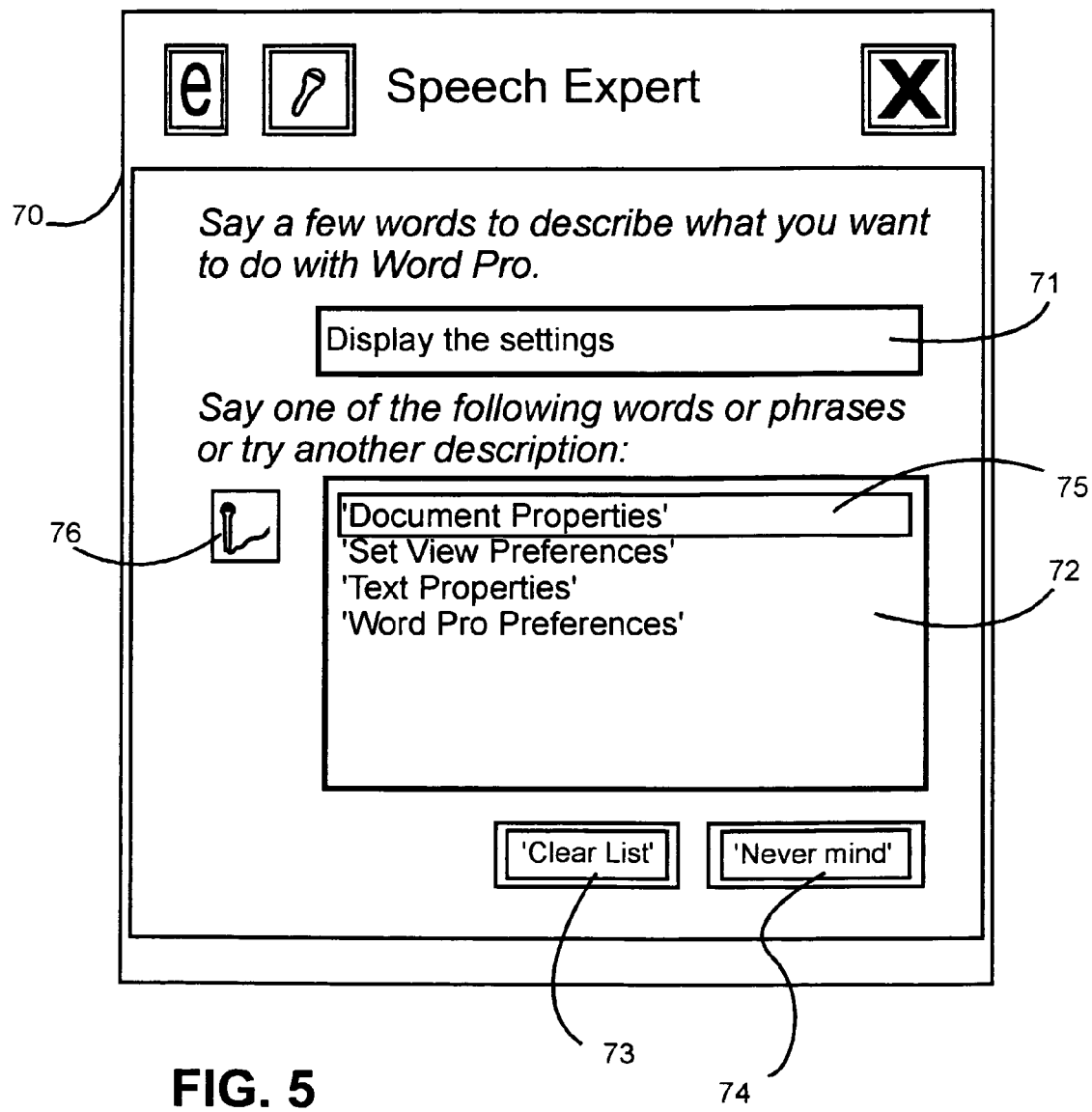
FIG. 5 is the display screen view of FIG. 4 after the user has finished inputting the speech term in FIG. 4. (The user may then say one of the listed commands.)

In the above description of display of commands both spoken and relevant with respect to FIG. 2, we did not go into the display of the spoken input which could include commands and speech terms which would be compared to the relevance table for relevant commands. It will be understood that the spoken input will also be displayed separately. This will be seen with respect to FIGS. 3 through 5 which will provide an illustrative example of how the present invention may be used to give the visual feedback of displayed spoken commands, as well as relevant commands in accordance with the present invention. When the screen image panels are described, it will be understood that these may be rendered by storing image and text creation programs, such as those in any conventional window operating system in the RAM 14 of the system of FIG. 1. The display screens of FIGS. 3 through 5 are presented to the viewer on display monitor 38 of FIG. 1. In accordance with conventional techniques, the user may control the screen interactively through a conventional I/O device such as mouse 26, FIG. 1, and speech input is applied through microphone 27. These operate through user interface 22 to call upon programs in RAM 14 cooperating with the operating system 41 to create the images in frame buffer 39 of display adapter 36 to control the display panels on monitor 38. The initial display screen of FIG. 3 shows a display screen with visual feedback display panel 70. In the panel, window 71 will show the words that the user speaks while window 72 will display all of the relevant commands, i.e. commands which were not actually spoken but some the spoken words or phrases in the window 71 were associated with the relevant commands through the relevance table, as shown in FIG. 2. Also, any spoken commands which were part of the spoken input in window 71 will also be listed along with the relevant commands in window 72. The panel also has command buttons: by pressing button 73 or saying the command, "Clear List", the user will clear both window 71 and window 72 in FIG. 3 of all proposed relevant commands and input text. Pressing button 74 or saying the command, "Never mind", causes the whole application to go away. FIG. 4 shows the screen panel 70 of FIG. 3 after the spoken entry, "Display the settings". The system could find no actual command in this terminology but was able to find the four relevant commands shown in window 72. Cursor icon 76 is adjacent the spoken term in window 71 as an indication that this field is the speech focus. In FIG. 5 we have the display of FIG. 4, after the speech focus as indicated by cursor icon 76 has been moved to window 73 and the user has chosen one of the relevant commands: "Document Properties" 75 by speaking the command; as a result, the command is highlighted. Upon the relevant command being spoken, the system will carry it out.

Figure 6:
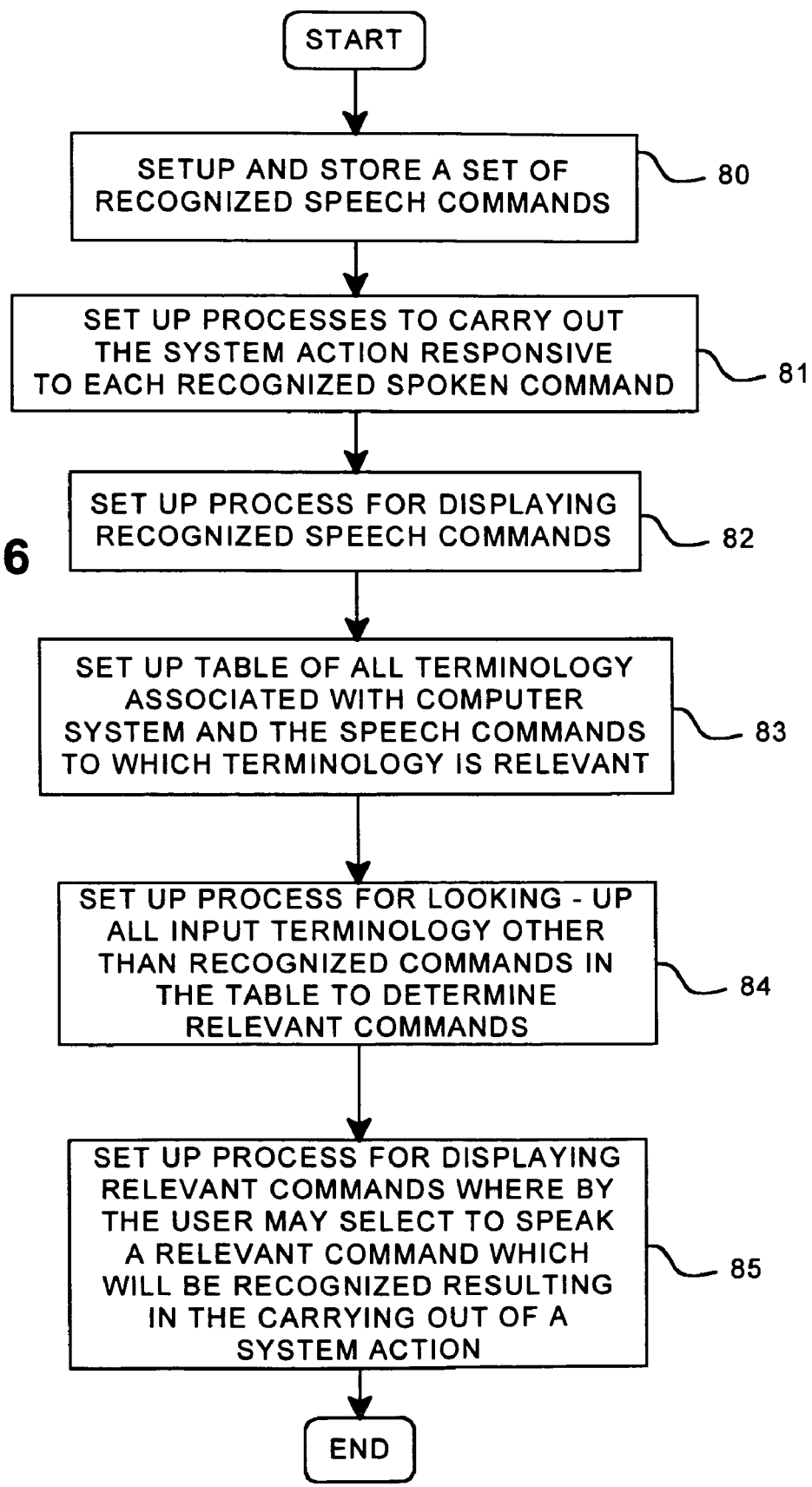
FIG. 6 is a flowchart of the basic elements of the system and program in a computer controlled display system for creating and using the speech command recognition with visual feedback system of the present invention.
Figure 7:
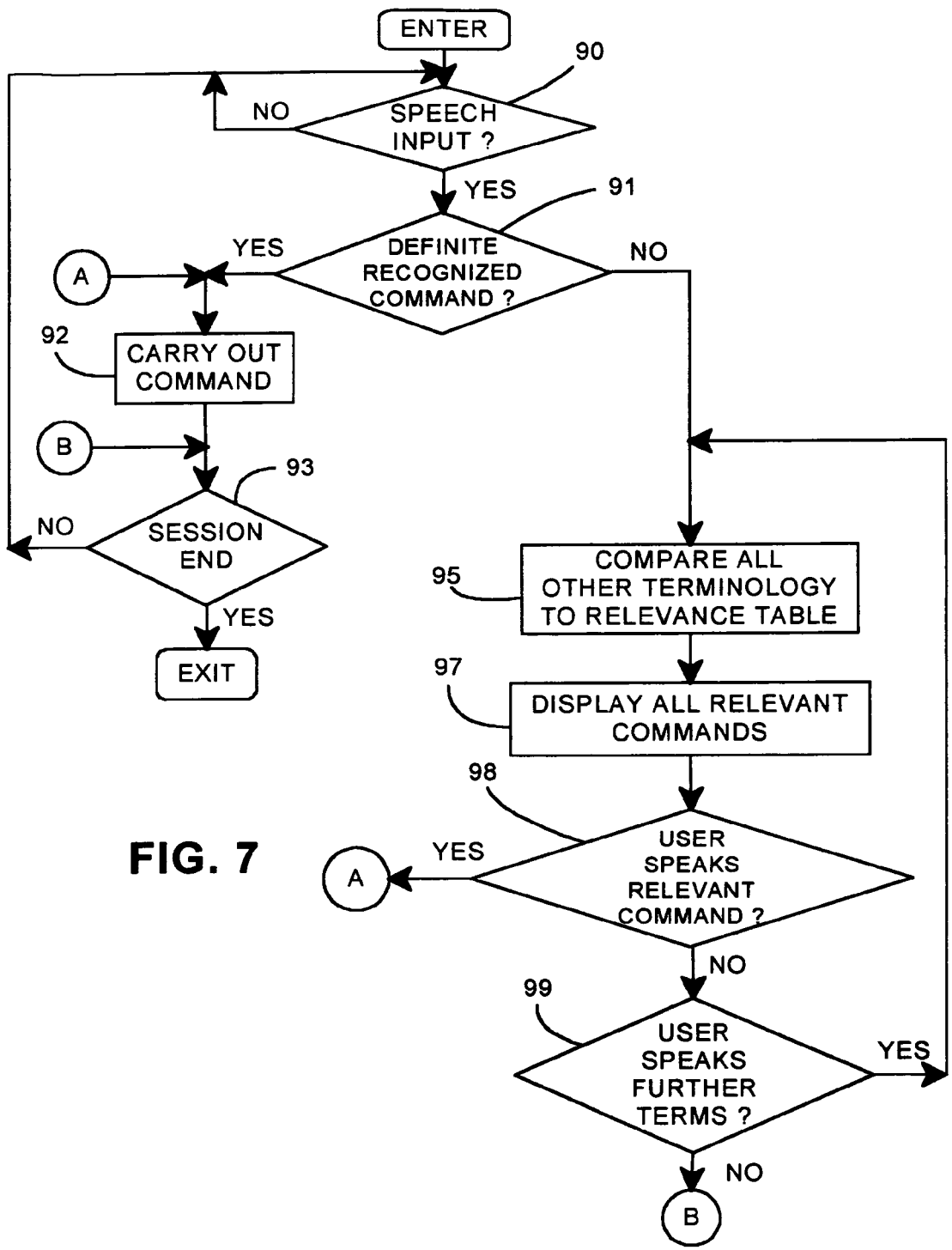
FIG. 7 is a flowchart of the steps involved in running the program set up in FIG. 6.

Now with reference to FIGS. 6 and 7 we will describe a process implemented by the present invention in conjunction with the flowcharts of these figures. FIG. 6 is a flowchart showing the development of a process according to the present invention for providing visual feedback to spoken commands and other terminology, including a listing of system proposed relevant spoken commands which the user may choose from. First, step 80, a set of recognizable spoken system and application commands which will drive the system being used is set up and stored. Then, there are set up appropriate processes to carry out the action called for by each recognized speech command, step 81. A process for displaying recognized speech commands is also set up. In doing so, the program developer has the option among others of displaying all recognized commands or only recognized commands which are not clearly recognized so that the user will have the opportunity of confirming the command. Then, step 83, there is set up a relevance table or table of relevant commands as previously described. This table hopefully includes substantially all descriptive phrases and terminology associated with the computer system and the actual commands to which each term is relevant. A process for looking up all spoken inputs, other than recognized commands, on this relevance table to then determine relevant commands is set up, step 84. This involves combining the system and application commands with the relevance table to generate the vocabulary of speech terms which will be used by the speech recognition system to provide the list of relevant commands. This has been previously described with respect to FIG. 2. Finally, there is set up a process for displaying relevant commands so that the user may choose a relevant command by speaking to set off the command action, step 85. This has been previously described with respect to FIG. 5. This completes the set up.

The running of the process will now be described with respect to FIG. 7. First, step 90, a determination is made as to whether there has been a speech input. If No, then the input is returned to step 90 where a spoken input is awaited. If the decision from step 90 is Yes, then a further determination is made in decision step 91 as to whether an command has been definitely recognized. At this point, we should again distinguish, as we have above, between spoken commands which the user apparently does not intend to be carried out as commands, i.e., they are just part of the input terminology or spoken query seeking relevant commands, and commands which in view of their presentation context are intended as definite commands. If a term in the context of a spoken query happens to match one of the commands, it is just listed with the relevant commands displayed as subsequently described with respect to step 97. On the other hand, if a definite command is recognized, then the decision at step 91 would be Yes, and the command is carried out in the conventional manner, step 92, and then a determination is made as to whether the session is at an end, step 93. If Yes, the session is exited. If No, the flow is returned to step 90 where a further spoken input is awaited. If the decision from step 91 was No, that a definite command was not recognized, then a comparison is made on the relevance table as previously described, step 95, and all relevant commands are displayed, step 97, to give the user the opportunity to select one of the relevant commands. At decision step 98, a determination is made as to whether the user has spoken one of the relevant commands. If Yes, then the process is returned to step 92 via branch "A" and the command is carried out. If the decision from step 98 is No, then a further decision is made, step 99, as to whether the user has spoken any further terms. If Yes, the process is returned to step 95 where a comparison is made to the relevance table and the above process is repeated. If the decision from step 99 is No, then the process is returned to step 93 via branch "B" where a decision is made as to whether the session is over as previously described.

In this specification, the terms, relevant commands and actual commands may have been used in various descriptions. Both refer to real commands, i.e. commands which the particular system may execute. The distinction is based on whether the command is actually spoken. Thus an actual command would be one which the user actually speaks whether it be as part of the spoken entry or query which the user has uttered for the purpose of locating relevant commands or the actual command is one which the user intends to be executed in the conventional manner. On the other hand, a relevant command would be a command which was not spoken by the user but was associated with a word or term in the user's spoken entry through the relevance table.

One of the preferred implementations of the present invention is as an application program 40 made up of programming steps or instructions resident in RAM 14, FIG. 1, during computer operations. Until required by the computer system, the program instructions may be stored in another readable medium, e.g. in disk drive 20, or in a removable memory such as an optical disk for use in a CD ROM computer input, or in a floppy disk for use in a floppy disk drive computer input. Further, the program instructions may be stored in the memory of another computer prior to use in the system of the present invention and transmitted over a LAN or a WAN, such as the Internet, when required by the user of the present invention. One skilled in the art should appreciate that the processes controlling the present invention are capable of being distributed in the form of computer readable media of a variety of forms.

Although certain preferred embodiments have been shown and described, it will be understood that many changes and modifications may be made therein without departing from the scope and intent of the appended claims.

The invention claimed is:

1. An interactive computer controlled display system with speech command input recognition comprising:
    means for predetermining a plurality of speech commands for respectively initiating each of a corresponding plurality of system actions,
    means for providing for each of said plurality of commands, an associated set of non-command speech terms, each term having relevance to its associated command,
    means for detecting speech command and non-command speech terms,
    means responsive to a detected speech command for displaying said command, and
    means responsive to a detected non-command speech term having relevance to one of said commands for displaying the relevant command simultaneously with said detected speech command.

2. The system of claim 1 further including interactive means for selecting a displayed command to thereby initiate a system action.

3. The system of claim 2 wherein said means for selecting said displayed command include speech command input means.

4. The system of claim 3 further including:
    a plurality of speech terms used in connection with specific actions of the system, and
    wherein said means for providing said associated set of speech terms include:
    a stored relevance table of universal speech input commands and universal computer operation terms conventionally associated with actions initiated by said input commands, and
    means for relating said plurality of speech terms used in connection with specific actions of said system with commands in said relevance table.

5. A method for providing speech command input to an interactive computer controlled display system with speech command input recognition comprising:
    predetermining a plurality of speech commands for respectively initiating each of a corresponding plurality of system actions,
    providing for each of said plurality of commands, an associated set of non-command speech terms, each term having relevance to its associated command,
    detecting speech command and speech terms,
    displaying a speech command responsive to its detection as a speech command, and
    responsive to a detected non-command speech term having relevance to one of said commands displaying the relevant command simultaneously with said detected speech command.

6. The method of claim 5 further including the step of interactively selecting a displayed command to thereby initiate a system action.

7. The method of claim 6 wherein said selecting of said displayed command include speech command input means.

8. The method of claim 7 further including the step of:
    providing a plurality of speech terms used in connection with specific actions of the system, and wherein said step of providing said associated set of speech terms includes:

storing a relevance table of universal speech input commands and universal computer operations terms conventionally associated with actions initiated by said input commands, and relating said plurality of speech terms used in connection with specific actions of said system with commands in said relevance table.

9. A computer readable storage device for speech command input recognition in an interactive computer controlled display system comprising:

means for predetermining a plurality of speech commands for respectively initiating each of a corresponding plurality of system actions, means for providing for each of said plurality of commands, an associated set of non-command speech terms, each term having relevance to its associated command, means for detecting speech command and non-command speech terms, means responsive to a detected speech command for displaying said command, and means responsive to a detected non-command speech term having relevance to one of said commands for displaying the relevant command simultaneously with said detected speech command.

10. The computer readable storage device of claim 9 further including interactive means for selecting a displayed command to thereby initiate a system action.

11. The computer readable storage device of claim 10 wherein said means for selecting said displayed command include speech command input means.

12. The computer readable storage device of claim 11 further including:

a plurality of speech terms used in connection with specific actions of the system, and wherein said means for providing said associated set of speech terms include:

a stored relevance table of universal speech input commands and universal computer operation terms conventionally associated with actions initiated by said input commands, and means for relating said plurality of speech terms used in connection with specific actions of said system with commands in said relevance table.

* * * * *